March 12, 1968 — H. SCHOLL — 3,372,680
TIME CONTROL CIRCUIT FOR FUEL INJECTION SYSTEM
Filed Feb. 8, 1966 — 4 Sheets-Sheet 1

INVENTOR
Hermann Scholl
by Michael J. Striker

March 12, 1968          H. SCHOLL          3,372,680

TIME CONTROL CIRCUIT FOR FUEL INJECTION SYSTEM

Filed Feb. 8, 1966          4 Sheets—Sheet 2

INVENTOR
Hermann Scholl by Michael J. Striker

March 12, 1968 H. SCHOLL 3,372,680
TIME CONTROL CIRCUIT FOR FUEL INJECTION SYSTEM
Filed Feb. 8, 1966 4 Sheets-Sheet 3
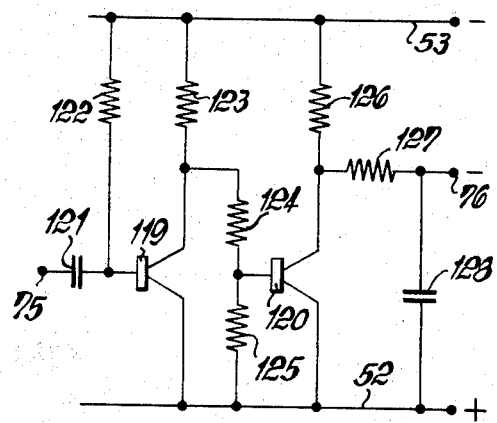
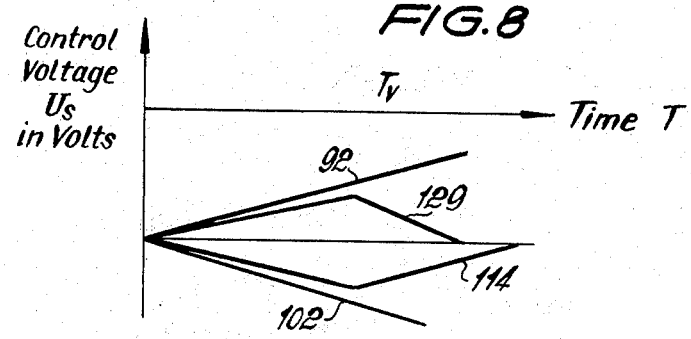
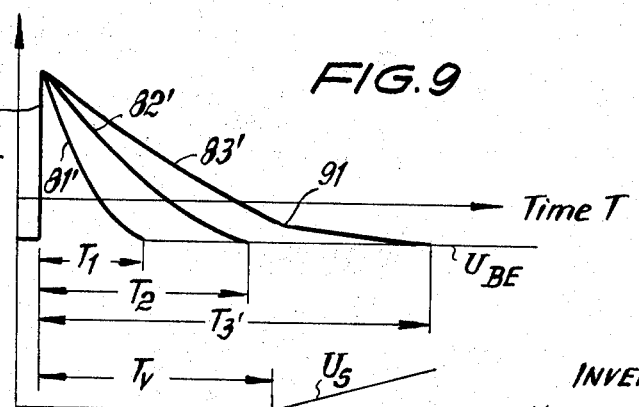
INVENTOR
Hermann Scholl
by Michael J. Striker
Atty

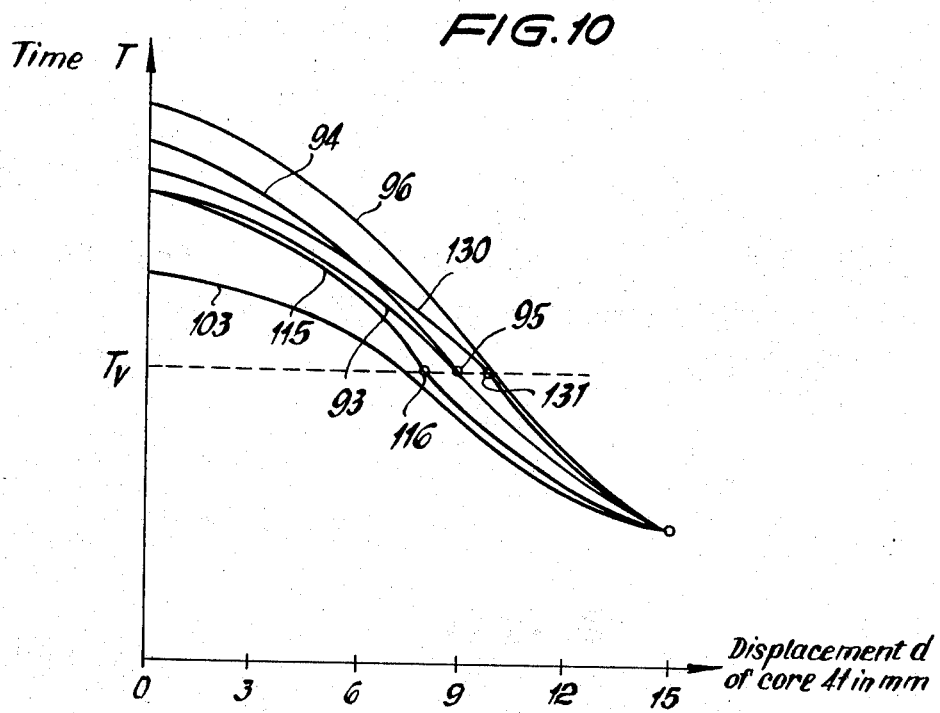

United States Patent Office 3,372,680
Patented Mar. 12, 1968

3,372,680
TIME CONTROL CIRCUIT FOR FUEL
INJECTION SYSTEM
Hermann Scholl, Stuttgart, Germany, assignor to Robert Bosch, G.m.b.H., Stuttgart, Germany
Filed Feb. 8, 1966, Ser. No. 525,986
Claims priority, application Germany, Feb. 11, 1965, B 80,465
15 Claims. (Cl. 123—139)

ABSTRACT OF THE DISCLOSURE

An electronic control arrangement for controlling the injection of fuel in internal combustion engines. A monostable multivibrator circuit actuated by a switching mechanism operated by the crankshaft of the engine provides a train of pulses transmitted to electromagnetic valves used to control the amount of fuel injected into the cylinders of the engine. The duration of the pulses, and hence the duration of the opening of the electromagnetic valves, is regulated through a variable core displacement transformer. The core of the displacement is positioned as a function of the pressure within the intake manifold. A time control circuit further modifies the duration of the pulses for actuating the electromagnetic fuel injection valve, so as to obtain the desired pulse duration versus core displacement characteristic. The time control circuit includes a transistor and a resistor connected in series with the emitter-collector path of the transistor. A capacitor is connected in parallel with the series combination of the resistor and transistor path. The output pulses of the monostable multivibrator circuit are applied to the base of the transistor. The output of the time control circuit is, in turn, fed back to the input circuit of the monostable multivibrator circuit to modify the duration of the pulses in the desired manner.

---

The present invention relates to a control circuit for a fuel injection system. More particularly, the invention relates to a time control circuit for a fuel injection system. The fuel injection system functions to inject fuel into the suction duct of an internal combustion engine via an electromagnetically operated injection valve which is controlled by the time control circuit of the present invention.

In a fuel injection system, the quantity of fuel fed to the engine must be varied in accordance with several parameters in a manner such that a determined fuel, air mixture is maintained and such that the engine is never fed too much or too little fuel. The time duration of the control pulses which operate the fuel injection valve, thereby controlling the quantity of fuel fed to and available for the corresponding work stroke per revolution of the engine, must be such that the quantity of fuel and air fed to the engine is in proper determined balance so that there is neither an excess of fuel nor an excess of air upon combustion. The injection time is controlled in known systems by the negative pressure, measured by a pressure indicator in the suction duct of the engine downstream of the throttle. The injection time is also controlled by parameters dependent upon the revolutions of the engine. The injection time may be varied additionally upon acceleration or idling of the engine. An exactly determined family of characteristic curves exists for each type of engine for determining the fuel requirement in accordance with the number of revolutions and the negative pressure in the suction duct. The corresponding engine operates at its peak efficiency when the characteristic curve for such engine is followed.

In a known type of injection system, a monostable multivibrator is provided with an iron core transformer connected in its feedback branch. The iron core of the transformer is movable in accordance with the negative pressure. The transformer operates to control the operating time of the multivibrator. The iron core transformer is advantageous because of its great durability due to the immunity of the movable core to wear under operating conditions. The iron core is so much more wear resistant than a variable resistor that there is no comparison between the two. When transistors are utilized with the transformer, considerably longer control pulses are provided than are provided with a capacitor.

A disadvantage of the movable iron core transformer is that it is difficult to provide the desired transformer characteristic curve of inductance versus mechanical variation of the core position to vary the magnetic field between the windings of the transformer and thereby vary the inductive coupling between said windings. The balancing or conformity of the mechanical variation of the core position and the inductance of the transformer is difficult due to manufacturing tolerances and structural changes in the cores during the manufacturing process. This necessitates later balancing of the transformer if it is to conform with the transformer characteristic curve. Thus, it is necessary to so balance the transformer if the control characteristic curve, which is the mechanical variation of the core position versus the initial point and the duration of the injection period, is to be as desired.

The balancing of the transformer to provide the desired transformer characteristic curve so that the desired control characteristic curve may be provided, is difficult, because it may be accomplished only in several steps and because it requires special equipment which may not always be available. Furthermore, in a known type of fuel injection system, only stacked lamellae or laminae may be utilized for the core of the transformer because only such lamellae or laminae permit the desired balancing of the transformer to provide the desired transformer characteristic curve. Pressed cores would be more desirable since they are facilely provided in the desired configuration and are inexpensive to manufacture.

The principal object of the present invention is to provide a new and improved time control circuit for a fuel injection system. The electronic time control circuit of the present invention permits the variation of the control characteristic curve without the balancing of the iron core transformer to provide the desired transformer characteristic curve. The time control circuit of the present invention permits the utilization of an inexpensive iron core transformer in the control circuit of the fuel injection system and is utilized with a fuel injection system and a control circuit therefor which are of simple structure, but are efficient, effective and reliable in operation, and which are inexpensive to manufacture.

In accordance with the present invention, a fuel injection system is provided for an internal combustion engine. The internal combustion engine has a suction duct, a fuel feeding system for feeding fuel to the engine through the suction duct, fuel injection valves in the fuel feeding system in the suction duct for controlling the quantity of fuel fed to the engine and having an electromagnetic control for controlling the operation thereof, a crankshaft rotated at a determined number of revolutions per unit time and a pressure indicator in the suction duct for measuring the pressure in the suction duct. The fuel injection system comprises a control circuit for controlling the quantity of fuel fed to the engine and has an input mechanically coupled to the crankshaft of the engine and an output connected to the electromagnetic control of the fuel injection valve. A transformer controls the time of operation of the control circuit in accordance with the number of revolutions of the engine thereby controlling the time of feeding and thus the quantity of fuel fed to the engine in accordance with the number of revolutions of the engine and has a movably mounted core mechanically coupled to the pressure indicator and movable in accordance with the variation of pressure in the suction duct to vary the inductance of the transformer and a determined transformer characteristic curve of inductance versus displacement of the core. The control circuit has a control characteristic of displacement of the core versus time of feeding of fuel to the engine. The control circuit further comprises a multivibrator having a stable state, an input, an output connected to the electromagnetic control of the fuel injection valve and a feedback path from the output to the input. The transformer is connected in the feedback path of the multivibrator. A pulse circuit is mechanically coupled to the crankshaft of the engine and produces an electrical pulse in accordance with the number of revolutions of the engine. The pulse circuit is connected to the input of the multivibrator for controlling the state of stability of the multivibrator in accordance with the number of revolutions of the engine. A control potential is applied to the input of the multivibrator and a control voltage is superimposed to the control circuit to further control the time of operation of the control circuit. In accordance with the present invention, a time control circuit is connected in the control circuit for varying the time of operation of the control circuit. The time control circuit is connected between the multivibrator and the source of control voltage and varies the control potential applied to the multivibrator in conjunction with the pulse applied to the multivibrator by the pulse circuit in accordance with the number of revolutions of the engine to control the operation of the multivibrator thereby varying the duration time of the pulse and controlling the operation of the fuel injection valve to control the time of feeding and thus the quantity of fuel fed to the engine. The time control circuit comprises a capacitor connected to the source of control voltage and a charging and discharging circuit connected to the capacitor. The charging and discharging circuit comprises a resistor and a transistor connected in series circuit arrangement with the resistor and connected in the control circuit in a manner whereby the transistor is controlled in operation in accordance with the number of revolutions of the engine and the series circuit arrangement is connected in parallel with the capacitor.

In order that the present invention may be readily carried into effect, it will now be described with reference to the accompanying drawings, wherein:

FIG. 7 is a circuit diagram of still another embodiment of the time control circuit 71 of the control circuit of the fuel injection system of FIG. 1;

FIG. 8 is a graphical presentation of the control voltage of the control circuit of the fuel injection system of FIG. 1;

FIG. 9 is a graphical presentation for explaining the operation of the embodiment of the time control circuit of FIG. 4; and FIG. 10 is a graphical presentation of the control characteristic curves of the control circuit of FIG. 1 utilizing the time control circuit of FIGS. 4, 5, 6 and 7, shown in comparison with each other.

Figure 1:
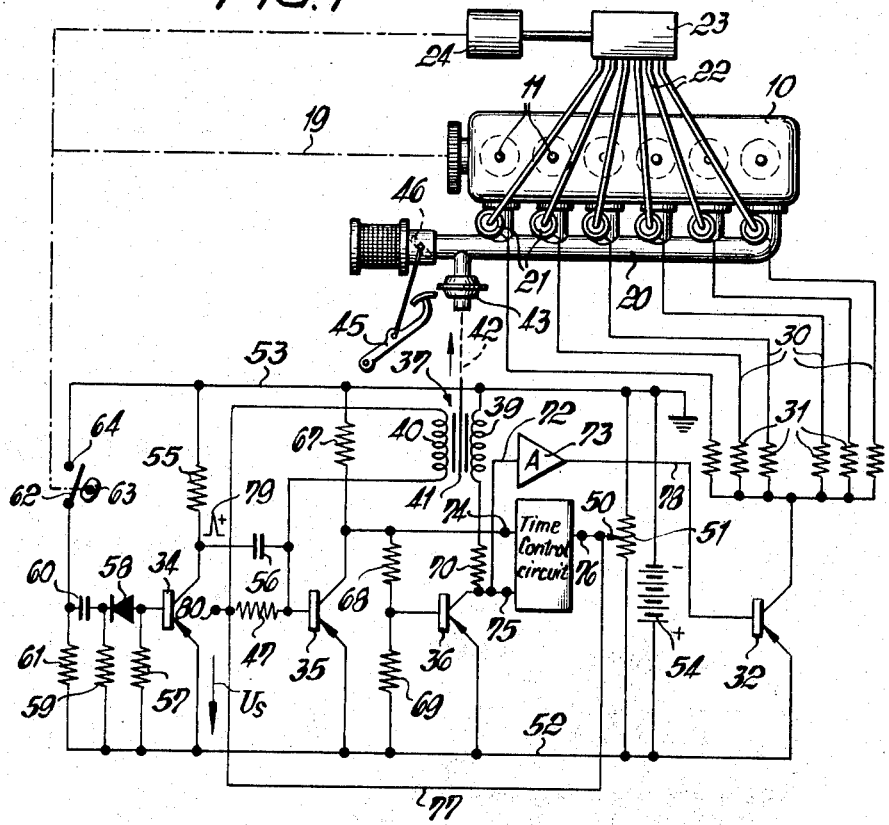
FIG. 1 is a circuit diagram of an embodiment of a fuel injection system including an embodiment of a control circuit which includes a time control circuit of the present invention.

In FIG. 1, a six cylinder internal combustion engine 10 has six spark plugs 11 connected to a high voltage ignition system (not shown in FIG. 1). Immediately adjacent the input valves (not shown in FIG. 1) of the engine 10 are six electromagnetically operable fuel injection valves 21 (FIG. 2) positioned on the distribution ducts of a suction duct 20. The six distribution ducts of the suction duct 20 lead to the six cylinders of the engine 10. Fuel is fed from a fuel source 23 to each of the six fuel injection valves 21 via fuel lines 22 and is admitted to the cylinders of the engine 10 by said fuel injection valves under the control of the control circuit of the present invention. The fuel source 23 is maintained at approximately constant pressure by a pump 24 which cooperates therewith and which is coupled to the crankshaft 19 of the engine by suitable mechanical linkage.

Figure 2:
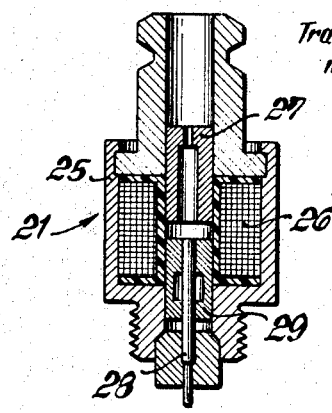
FIG. 2 is a side sectional view of a fuel injection valve 21 of the fuel injection system of FIG. 1.

As shown in FIG. 2, each fuel injection valve comprises a housing 25 of magnetizable material. An energizing winding 26 is positioned in the housing 25. A stationary iron core 27 is coaxially positioned in the winding 26. A movable armature 29 is coaxially positioned in the winding 26 and coaxially supports a jet needle 28. One of the ends of the electrical conductor which comprises the energizing winding 26 is electrically connected to the housing 25 by suitable means (not shown in FIG. 2) and the other end of said electrical conductor is connected to a corresponding one of six resistors 31 via a corresponding one of six connecting leads 30.

The resistors 31 are connected in common at their ends opposite those connected to the leads 30 and the common connection of said resistors is connected to the collector electrode of a power transistor 32 of the control circuit. In the control circuit, a PNP type transistor 34 functions, together with its associated circuitry, as a pulse former, and PNP type transistors 35 and 36 function together with their associated circuitry, as a monostable multivibrator. An iron core transformer 37, having a core which is variable in position in accordance with the negative pressure in the suction duct 20 of the engine 10, cooperates with the monostable multivibrator.

The iron core transformer 37 has a primary winding 39, a secondary winding 40 and an iron core 41. The primary winding 39 and the secondary winding 40 are both wound on the core 41 of the transformer 37. The iron core 41 of the transformer 37 is affixed to one end of and moves with a rod 42 which is affixed at its other end to the diaphragm of a negative pressure indicator 43. Thus, the iron core 41, which is movably mounted in the transformer 37, is varied in position with variation of pressure so that the inductance of said transformer varies with decreasing absolute pressure in the suction duct 20 and varies inversely with increasing vacuum in said suction duct. The pressure indicator 43 is positioned in the suction duct 20 just behind the throttle 46 of the engine 10. The throttle 46 is operated by a foot pedal 45 which is mechanically coupled thereto. As the vacuum in the suction duct 20 increases, the pressure indicator 43 moves the iron core 41 of the transformer 37 in the direction of the arrow adjacent the rod 42.

One end of the secondary winding 40 of the transformer 37 is directly connected to the base electrode of the transistor 35 and to one end of a resistor 47 connected to said base electrode at a common point in the connection between said resistor and said base electrode. The other end of the secondary winding 40 is directly connected to the movable contact arm or tap 50 of a potentiometer 51 and to the other end of the resistor 47. The potentiometer 51 is connected between the positive and negative terminals of a battery 54 via a positive voltage lead 52 and a grounded negative voltage lead 53; one end of said potentiometer being conected to the positive battery terminal via said positive voltage lead and the other end of said potentiometer being connected to the negative battery terminal via said negative voltage lead. The battery 54 may produce a voltage of, for example, 12 volts. The potential of the positive voltage lead 52 serves as the zero reference potential.

The emitter electrode of each of the transistors 32, 34, 35 and 36 is directly connected to the positive voltage lead 52. The collector electrode of the transistor 34 is connected to the negative voltage lead 53 via a collector resistor 55 and is connected to the base electrode of the transistor 35 via a capacitor 56. The base electrode of the transistor 34 is connected to the positive voltage lead 52 via a resistor 57 and is connected to the anode of a diode 58. The diode 58 is connected in series with the base electrode of the transistor 34 and a capacitor 60; the cathode of said diode being connected to the positive voltage lead 52 via a resistor 59 and via said capacitor 60 and a resistor 61.

The resistor 61 is connected to the armature 62 of a switch 62, 63, 64 having a contact 64 and being operated by a cam 63. The capacitor 60, and therefore the series circuit arrangement of the capacitor 60, the diode 58 and the base electrode of the transistor 34, is connected to a common point in the connection between the resistor 61 and the switch armature 62. The cam 63 is mechanically coupled to the crankshaft 19 of the engine 10 and comprises a two projection cam. The cam 63 periodically abuts the switch armature 62 in a manner whereby said cam closes said switch armature so that it makes electrical contact with the contact 64 of the switch 62, 63, 64 twice during each revolution of the crankshaft 19. The contact 64 of the switch 62, 63, 64 is connected to the negative voltage lead 53.

The collector electrode of the transistor 35 is connected to the negative voltage lead 53 via a resistor 67 and is connected via a resistor 68 to the base electrode of the transistor 36 and via the resistor 68 and a resistor 69 to the positive voltage lead 52; said base electrode being connected to a common point in the connection between the resistors 68 and 69. The collector electrode of the transistor 36 is connected to the negative voltage lead 53 via the series circuit arrangement of a resistor 70 and the primary winding 39 of the transformer 37 and is directly connected to the input of an amplifier 73 via a lead 72. The contact arm 50 of the potentiometer 51 is directly connected to a terminal 80 and to the resistor 47 via a lead 77. The output of the amplifier 73 is directly connected to the base electrode of the power transistor 32 via a lead 78.

The time control circuit 71 of the present invention is connected with the monostable multivibrator via terminals 74, 75 and 76 and functions to provide the desired control characteristic curve for the control circuit, in accordance with the present invention. The terminal 74 of the time control circuit 71 is connected to the collector electrode of the transistor 35. The terminal 75 of the time control circuit 71 is connected to the collector electrode of the transistor 36 and the terminal 76 is connected to the contact arm 50 of the potentiometer 51. The time control circuit 71 may comprise any of the embodiments of FIGS. 4, 5, 6 or 7, depending upon how the control characteristic curve of the control circuit is to be varied.

Without the time control circuit 71 of the present invention, the control circuit of the fuel injection system of FIG. 1 operates as follows. As long as the switch armature 62 is open, as shown in FIG. 1, the transistor 34 is in its non-conductive condition because the positive potential of the positive voltage lead 52 is applied to its base electrode. When the cam 63 closes the switch 62, 63, 64 by moving the switch armature 62 into electrical contact with the contact 64, a current flows from the positive voltage lead 52 to the negative voltage lead 53 via the emitter-base path of the transistor 34, the diode 58, the capacitor 60 and said switch, and switches said transistor to its conductive condition. A current then flows in the emitter-collector path of the transistor 34 and such collector current produces a voltage drop at the collector resistor 55 so that the collector voltage of said transistor increases in a positive direction. The collector voltage increase of the collector voltage of the transistor 34, which is indicated by the voltage pulse 79 of FIG. 1, is applied to the base electrode of the transistor 35 via the coupling capacitor 56.

When the transistor 35 is in its conductive condition and the transistor 36 is in its non-conductive condition, the monostable multivibrator is in its stable state. A negative control voltage $U_s$ between the terminal 80 and the positive voltage lead 52 is varied to such a high magnitude by the potentiometer 51 that the transistor 35 is made completely conductive via the resistor 47. That is, a potential $U_{BEO}$ is applied to the base electrode of the transistor 35 and a corresponding voltage drop occurs across the resistor 47 due to the base current of said transistor.

If the positive trigger pulse 79 is applied to the base electrode of the transistor 35 via the coupling capacitor 56, said transistor is switched to its non-conductive condition. The collector voltage of the transistor 35 increases considerably in a negative direction and switches the transistor 36 to its conductive condition via the resistor 68 and the base electrode of said transistor 36. The transistor 36 then conducts a collector current which increases exponentially in the primary winding 39 of the transformer 37 with a time constant which depends upon the inductance of said transformer. The secondary winding 40 of the transformer 37 produces a corresponding exponentially decreasing voltage difference having an initial magnitude $\Delta U$ which maintains the transistor 35 in its non-conductive condition for the determined period of duration of the pulse.

Figure 3:
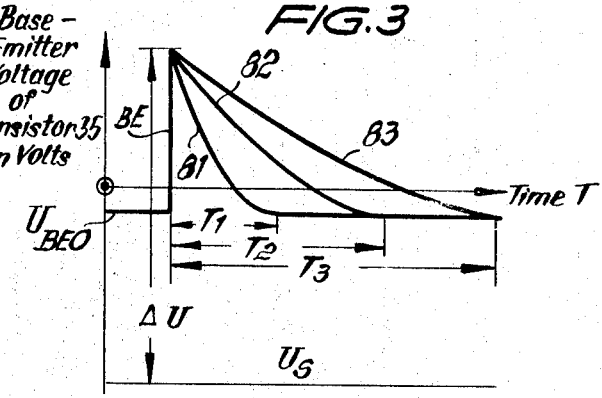
FIG. 3 is a graphical presentation for explaining the operation of the control circuit of the fuel injection system of FIG. 1.

The period of duration of the pulse is directly proportional to the time constant of the transformer 37, which time constant is proportional to the inductance of said transformer. The pulse duration is thus proportional to the inductance of the transformer 37. This is illustrated in FIG. 3, wherein the abscissa indicates the time T and the ordinate indicates the base-emitter voltage $U_{BE}$ of the transistor 35. FIG. 3 shows the duration time of the pulse for three different time constants of the transformer 37. In the stable state of the monostable multivibrator, the transistor 35 emitter-base voltage $U_{BE}$ is approximately equal to the diffusion voltage $U_{BEO}$ of the transistor 35. The difference in magnitude between the voltage $U_{BEO}$ and the control voltage $U_s$ is equal to the voltage drop produced at the resistor 47 by the base current of the transistor 35.

The voltage difference $\Delta U$ induced in the secondary winding 40 of the transformer 37 decreases exponentially. The asymptote of the exponential voltage function is the control voltage $U_s$ which is shown as a constant in FIG. 3. The base-emitter voltage $U_{BE}$ of the transistor 35 is shown in FIG. 3 for these different time constants of the transformer 37. The first time constant corresponds to a small inductance of the transformer 37, which corresponds to a high vacuum in the suction duct 20, and results in a pulse duration period of time T1, as indicated by curve 81. The second time constant corresponds to a lesser vacuum in the suction duct 20, and results in a pulse duration period of time T2, as indicated by curve 82. The third time constant corresponds to a still larger inductance of the transformer 37, which corresponds to still less of a vacuum in the suction duct 20, and results in a pulse duration period T3, as indicated by curve 83.

When the base-emitter voltage $U_{BE}$ of the transistor 35 decreases to the magnitude of its diffusion voltage $U_{BEO}$, said transistor is switched to its conductive condition and the transistor 36 is switched to its non-conductive condition by the collector voltage of the transistor 35 which is then increased in a positive direction. In FIG. 3, the first, second and third time constants of the transformer 37 are in the ratio 1:2:3. The linear relationship of the pulse duration periods T1, T2 and T3 provides the ratio 1:2:3.

The variation of the collector voltage of the transistor 36 to a negative magnitude, having a period which corresponds to the corresponding pulse duration period, is amplified by the amplifier 73 after being applied thereto via the lead or conductor 72. The amplifier 73 controls the operation of the power transistor 32 via the lead or conductor 78. The amplifier 73 controls the power transistor 32 in a manner whereby the energizing windings 26 of the fuel injection valves 21 are energized via the resistors 31 and the lead 30, so that the jet needles 28 are moved into their open position, as long as the transistor 36 is in its conductive condition. A quantity of fuel which is directly proportional to the pulse duration period T is thus fed to the six cylinders of the engine 10 via the fuel injection valves 21 from the fuel source 23. If desired, less than six of the fuel injection valves 21 may be operated at the same time. Thus, for example, three fuel injection valves 21 may be operated at the same time. This is accomplished by appropriate modification of the control circuit.

Figure 4:
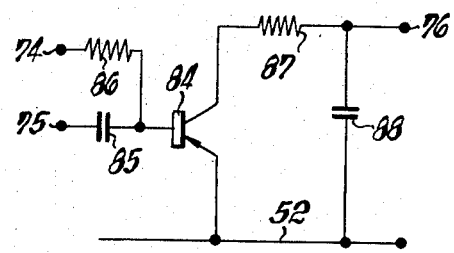
FIG. 4 is a circuit diagram of an embodiment of the time control circuit 71 of the control circuit of the fuel injection system of FIG. 1.

FIG. 4 is an embodiment of the time control circuit 71 of the control circuit of the fuel injection system of FIG. 1. The embodiment of FIG. 4 functions to increase the pulse duration period T for such period lengths that are longer than a determined pulse duration period $T_v$ (FIG. 9). The embodiment of FIG. 4 comprises a PNP type transistor 84 having an emitter electrode connected to the positive voltage lead 52. The base electrode of the transistor 84 is connected to the terminal 75 via a capacitor 85 and is connected to the terminal 74 via a resistor 86. The collector electrode of the transistor 84 is connected to the terminal 76 via a resistor 87. A charging capacitor 88 is connected between the terminal 76 and the positive voltage lead 52.

The time control circuit of FIG. 4 operates as follows. When the monostable multivibrator is in its stable state, with the transistor 35 in its conductive condition, the transistor 36 in its non-conductive condition, the capacitor 85 is charged by the battery 54 (FIG. 1) to the voltage of said battery, since one of the plates of said capacitor is connected to the positive voltage lead 52 via the resistor 86, the terminal 74 and the current conducting transistor 35 and the other of the plates of said capacitor is connected via the terminal 75, the collector resistor 70 and the primary winding 39 of the transformer 37 to the negative voltage lead 53. Since the transistor 36 is in its non-conductive condition, it does not conduct current to the positive voltage lead 52 and therefore does not interfere with the charging of the capacitor 85. The transistor 84 is in its non-conductive condition.

If the multivibrator is then switched to its astable state, so that the transistor 35 is in its non-conductive condition and the transistor 36 is in its conductive condition, a positive voltage pulse is applied to the base electrode of transistor 84 via the capacitance 85 due to the more positive collector voltage of the transistor 36. The transistor 84 remains in its non-conductive condition for a period of time sufficient for the capacitor 85 to discharge via the resistor 86 until the base voltage of the transistor 84 is sufficiently negative to switch said transistor to its conductive condition. The discharge time of the capacitor 85 is the determined period $T_v$ of FIG. 9.

As long as the transistor 84 is in its non-conductive condition, the control voltage $U_s$ at the terminal 76 remains constant and is determined by the setting of the contact arm 50 of the potentiometer 51 and by the base current of the transistor 35. During the time that the transistor 84 is in its non-conductive condition, the charging capacitor 88 is charged to the control voltage $U_s$. When, after the termination of the time period $T_v$ (FIG. 9), the transistor 84 is switched to its conductive condition, the charging capacitor 88 is discharged via the collector resistor 87 and the emitter-collector path of said transistor, and the control voltage $U_s$ begins to increase in magnitude in a positive direction, as shown in FIG. 9. The increase in the control voltage $U_s$ is in accordance with an exponential function which is essentially linear at its lower magnitudes as shown in FIG. 9.

Since the control voltage $U_s$ is the asymptote of the exponentially decreasing base-emitter voltage $U_{EB}$ of the transistor 35, as hereinbefore indicated and as shown in FIG. 9, the curve 83' which corresponds to the largest time constant, results in a pulse duration period T3' which is longer than the time period $T_v$. The curve 83' has a pronounced bend or knee 91 which corresponds to the time at which the transistor 84 is switched to its conductive condition and which indicates the transition of the curve from a steep slope to a considerably less steep slope. The pulse duration period T3' of FIG. 9 is thus longer than the corresponding pulse duration period T3 of FIG. 3. Thus, in FIG. 3 the ratio of T1:T2:T3 is 1:2:3, whereas in FIG. 9, due to the time control circuit of FIG. 4, the ratio of T1:T2:T3' is 1:2:3.75. The pulse duration is thus no longer proportional to the inductance of the transformer 37.

The pulse duration is not proportional to the inductance of the transformer 37 only when the pulse duration period is longer than the delay time period $T_v$. When the pulse duration period is shorter than the delay time period $T_v$, the transistor 84 is not switched to its conductive condition, so the operation is the same as is illustrated in FIG. 3. The delay time $T_v$ may be varied as desired by variation of the capacitance of the capacitor 85 and the resistance of the resistor 86. If the capacitance of the capacitor 85 is decreased to zero, the delay time $T_v$ is decreased to zero and the control voltage $U_s$ is varied to the curve 92 of FIG. 8. In FIG. 9, the abscissa indicates the time T and the ordinate indicates the base-emitter voltage $U_{BE}$ of the transistor 35 in volts, when the time control circuit 71 comprises the embodiment of FIG. 4. In FIG. 8, the abscissa indicates the time T and ordinate indicates the control voltage $U_s$ in volts.

FIG. 10 illustrates the control characteristic curves of the control circuit of FIG. 1 utilizing the time control circuits of FIGS. 4, 5, 6 and 7. In FIG. 10, the abscissa indicates the distance $d$ in mm. which the core 41 of the transformer 37 is moved (FIG. 1) and the ordinate indicates the pulse duration time T. At a zero mm. displacement of the core 41, which is no displacement at all, the least vacuum is in the suction duct 20, and at a maximum displacement of the core 41 of 15 mm., the highest vacuum is in said suction duct. The curve 93 is the control characteristic curve for the control circuit of FIG. 1 when a time control circuit 71 of the present invention is not utilized.

In FIG. 10, the curve 94 is the control characteristic curve for the control circuit of FIG. 1 when the time control circuit of FIG. 4 is utilized. The delay time $T_v$ is the time at which the control characteristic curves 93 and 94 intersect, said curves being separate and divergent at times longer than the time $T_v$ and being coincident at times shorter than said time $T_v$. The curve 96 is the control characteristic curve for the control circuit of FIG. 1 when the time control circuit of FIG. 4 is utilized and the capacitance of the capaictor 85 of said time control circuit is zero. Whereas the maximum pulse duration period variation represented by the curve 93 is 1:3, the maximum pulse duration period variation represented by the curve 96 is 1:4.2. The utilization of the time control circuit of FIG. 4 is thus desirable when the movement or displacement of the core 41 of the transformer 37 does not permit sufficient variation of the inductance of said transformer and the variation of said inductance does not have the desired relation to the displacement of said core. The time control circuit of FIG. 4 thus lengthens the period of fuel injection.

Figure 5:
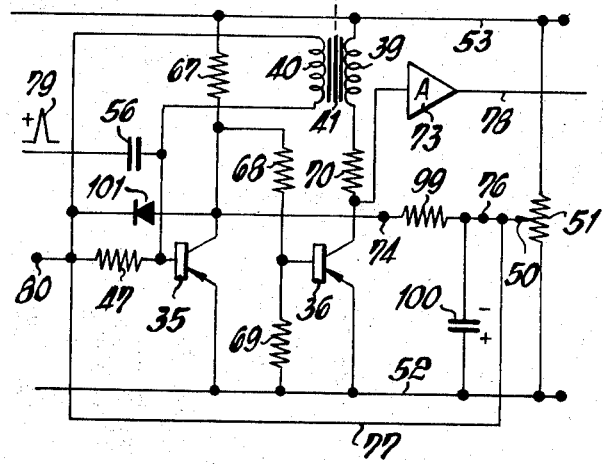
FIG. 5 is a circuit diagram of another embodiment of the time control circuit 71 of the control circuit of the fuel injection system of FIG. 1.

FIG. 5 is another embodiment of the time control circuit of the control circuit of the fuel injection system of FIG. 1. The time control circuit of FIG. 5 is utilized when the movement or displacement of the core 41 of the transformer 37 produces an excessive variation of the inductance of said transformer. Some of the components of the control circuit of FIG. 1 are shown in FIG. 5 in order to describe the time control circuit of FIG. 5 in its proper context. The time control circuit of FIG. 5 comprises a resistor 99 connected between the terminals 74, and 76, a capacitor 100 connected between a common point in the connection between said resistor 99 and said terminal 76 and the positive voltage lead 52, and a diode 101 having an anode connected to the terminal 74 and the collector electrode of the transistor 35 and a cathode connected to the terminal 80. The diode 101 is preferably a silicon diode or a Zener diode so that a very low magnitude current flows through it if the base and colllector electrodes of the transistor 35 have the same voltage. The breakdown or Zener voltage is selected to be a higher magnitude than that of the voltage drop at the resistor 47.

The time control circuit of FIG. 5 operates as follows. In the stable state of the monostable multivibrator, the transistor 35 is in its conductive condition. Since the resistor 99 and the capacitor 100 are connected in series with each other and the series connection is in parallel with the emitter-collector path of the transistor 35, only the control voltage $U_s$, provided by the potentiometer 51, is applied to the capacitor 100.

If a positive pulse 79 is applied to the base electrode of the transistor 35 via the capacitor 56, said transistor is switched to its non-conductive condition and the transistor 36 is switched to its conductive condition. The collector voltage of the transistor 35 decreases to a more negative magnitude and a charging current is applied to the capacitor 100 via the collector resistor 67 and the resistor 99. Thus, the voltage of the capacitor 100 is increased in magnitude; that is, the potential at the terminal 76 and the base potential of the transistor 35 decrease to a more negative magnitude. The decrease of the base voltage of the transistor 35 follows a logarithmic or exponential function which in its initial magnitude range is approximately linear. Since the base voltage of the transistor 35 decreases to a more negative magnitude, the effect of the time control circuit of FIG. 5 is the reverse of that of FIG. 4, as shown in FIG. 9. The time control circuit of FIG. 5 functions to shorten the pulse duration period.

When the pulse 79 terminates, the monostable multivibrator is switched back to its stable state and the transistor 35 is again switched to its conductive condition. The diode 101 functions as a discharge circuit for the capacitor 100 to assure the discharge of said capacitor until the next pulse 79 is applied to the base electrode of the transistor 35, even when the pulse duration period is very short due to a large number of revolutions of the engine crankshaft 19. The discharge circuit for the capacitor 100 includes the emitter-collector path of the transistor 35. When the transistor 35 is in its conductive condition, the diode 101 bridges the resistor 47.

The control voltage $U_s$ of the time control circuit of FIG. 5 is shown by the curve 102 of FIG. 8. The control characteristic curve for the control circuit of FIG. 1, when the time control circuit of FIG. 5 is utilized, is shown by the curve 103 of FIG. 10. The curve 103 of FIG. 10 shows a small variation of pulse duration time with displacement of the core 41 of the transformer 37. The ratio indicating the maximum pulse duration period variation represented by the curve 103 is 1:2.9. The time control circuit of FIG. 5 thus shortens the period of fuel injection.

Figure 6:
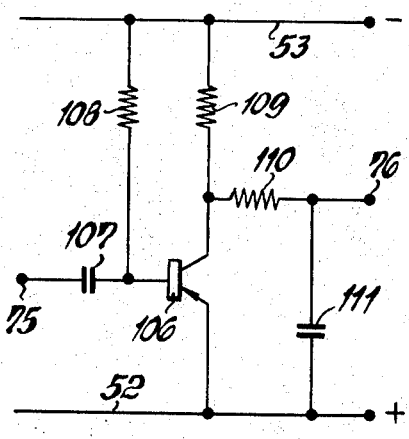
FIG. 6 is a circuit diagram of another embodiment of the time control circuit 71 of the control circuit of the fuel injection system of FIG. 1.

FIG. 6 is another embodiment of the time control circuit of the control circuit of the fuel injection system of FIG. 1. The time control circuit of FIG. 6 comprises a PNP type transistor 106 having a base electrode connected to the terminal 75 via a capacitor 107 and connected to the negative voltage lead 53 via a resistor 108. The emitter electrode of the transistor 106 is directly connected to the positive voltage lead 52. The collector electrode of the transistor 106 is connected to the negative voltage lead 53 via a collector resistor 109 and is connected to the terminal 76 via a resistor 110. A capacitor 111 is connected between the terminal 76, at a common point in the connection between the resistor 110 and the terminal 76, and the positive voltage lead 52.

The time control circuit of FIG. 6 operates as follows. In the stable state of the monostable multivibrator, the transistors 35 and 106 are in their conductive condition and the capacitor 111 is charged to the control voltage $U_s$ provided by the potentiometer 51. If a positive pulse 79 is applied to the base electrode of the transistor 35 (FIG. 1), said transistor is switched to its non-conductive condition and the transistor 36 is switched to its conductive condition. The collector voltage of the transistor 36 (FIG. 1) thus increases in a positive direction. The variation in the collector voltage of the transistor 36 is applied to the base electrode of the transistor 106 via the capacitor 107 and switches the transistor 106 to its non-conductive condition.

When the transistor 106 is switched to its non-conductive condition, its collector voltage decreases to a more negative magnitude and a charging voltage is applied to the capacitor 111 via the resistors 109 and 110 and charges said capacitor. The voltage at the terminal 76 and the base voltage of the transistor 35 are thus initially decreased to a more negative magnitude. Thus, for short pulse duration periods, the time control circuit of FIG. 6 provides the same effect as the time control circuit of FIG. 5 and the pulse duration periods are shortened.

When the capacitor 107 discharges sufficiently after the delay time $T_v$ via the resistor 108, the transistor 106 is again switched to its conductive condition. The transistor 106 in its conductive condition provides a discharge circuit for the capacitor 111 which discharges via the resistor 110 and the emitter-collector path of said transistor. The voltage at the terminal 76 and the base voltage of the transistor 35 again increase in a positive direction. Thus, for pulse duration periods longer than the delay time $T_v$, the time control circuit of FIG. 6 provides the same effect as the time control circuit of FIG. 4 and the pulse duration periods are lengthened.

The control voltage $U_s$ of the time control circuit of FIG. 6 is shown by the curve 114 of FIG. 8. The control characteristic curve for the control circuit of FIG. 1 when the time control circuit of FIG. 6 is utilized, is shown by the curve 115 of FIG. 10. The control characteristic curve 115 has a bend or knee 116 which corresponds to the time $T_v$ at which the time control circuit of FIG. 6 changes from similarity in effect to the time control circuit of FIG. 4 as evidenced by its similarity with the curve 94 above said bend, to similarity in effect to the time control circuit of FIG. 5, as evidenced by its similarity with the curve 103 below said bend. The bend or knee 116 indicates the transition of the curve from a steep slope to a less steep slope. The time control circuit of FIG. 6 thus shortens the period of fuel injection while the vacuum in the suction duct 20 (FIG. 1) is lessening and then lengthens the period of fuel injection while said vacuum lessens further.

FIG. 7 is still another embodiment of the time control circuit of the control circuit of the fuel injection system of FIG. 1. The time control circuit of FIG. 7 comprises two PNP type transistors 119 and 120 each having an emitter electrode directly connected to the positive voltage lead 52. The base electrode of the transistor 119 is connected to the terminal 75 via a capacitor 121 and is connected to the negative voltage lead 53 via a resistor 122. The collector electrode of the transistor 119 is connected to the negative voltage lead 53 via resistor 123 and is connected to the base electrode of the transistor 120 via a resistor 124 and to the positive voltage lead 52 via said resistor 124 and a resistor 125 which is connected between a common point in the connection between the resistor 124 and the base electrode of the transistor 120 and the positive voltage lead 52. The collector electrode of the transistor 120 is connected to the negative voltage lead 53 via a collector resistor 126 and is connected to the terminal 76 via a resistor 127. A capacitor 128 is connected between the terminal 76 and the positive voltage lead 52.

The time control circuit of FIG. 7 operates as follows. The transistor 119 and the RC circuit 122, 121 functions as a delay stage and the transistor 120 functions as a reversal stage, so that the time control circuit of FIG. 7 provides the same effect as the time control circuit of FIG. 6, but in reverse order. When the monostable multivibrator is in its stable state, the transistor 119 is in its conductive condition. When a pulse 79 is applied to the base electrode of the transistor 35 (FIG. 1), the multivibrator is switched to its astable state and the transistor 119 is switched to its non-conductive condition. The transistor 119 remains in its non-conductive condition until the capacitor 121 discharges sufficiently through the resistor 122.

When the transistor 119 is in its non-conductive condition, the transistor 120 is switched to its conductive condition due to the negative collector voltage of the transistor 119. The capacitor 128, charged to a determined negative control voltage $U_s$ provided by the potentiometer 51 (FIG. 1), is then discharged via the resistor 127 and the emitter-collector path of the transistor 120. The discharge of the capacitor 128 increases the voltage at the terminal 76 in a positive direction, as shown by curve 129 of FIG. 8. Thus, for short pulse duration periods, the time control circuit of FIG. 7 provides the same effect as the time control circuit of FIG. 4 and the pulsed duration periods are lengthened.

After the expiration of the delay time $T_v$, the transistor 119 is switched to its conductive condition and the transistor 120 is switched to its non-conductive condition. The capacitor 128 is then charged to a higher voltage and the voltage at the terminal 76 decreases to a more negative magnitude, as shown by the curve 129 of FIG. 8. Thus, for pulse duration periods longer than the delay time $T_v$, the time control circuit of FIG. 7 provides the same effect as the time control circuit of FIG. 5 and the pulse duration periods are shortened.

The control voltage $U_s$ of the time control circuit of FIG. 7 is, as hereinbefore indicated, shown by the curve 129 of FIG. 8. The control characteristic curve for the control circuit of FIG. 1 when the time control circuit of FIG. 7 is utilized, is shown by the curve 130 of FIG. 10. The control characteristic curve 130 has a bend or knee 131 which corresponds to the time $T_v$ at which the time control circuit of FIG. 7 changes from similarity in effect to the time control circuit of FIG. 5, as evidenced by its similarity with the curve 103 above said bend, to similarity in effect to the time control circuit of FIG. 4, as evidenced by its similarity with the curve 96 below said bend. The bend or knee 131 indicates the transition of the curve from a less steep slope to a more steep slope. The time control circuit of FIG. 7 thus lengthens the period of fuel injection while the vacuum in the suction duct 20 (FIG. 1) is lessening and then shortens the period of fuel injection while said vacuum lessens further.

The time control circuit of FIGS. 4, 5, 6 and 7 are thus simple arrangements for varying the control characteristics curve of the control circuit with facility and at small expense without the necessity for varying the transformer characteristic curve of the transformer 37. The control characteristic curves of FIG. 10 illustrate how many different possibilities exist for varying the control characteristic curve of the control circuit by utilization of the time control circuits of the present invention. Any suitable components of the control circuit and of the fuel injection system such as, for example, any suitable transformer 37 and any suitable pressure indicator 43 may be utilized with the time control circuits of the present invention. Since all necessary components are included, components need merely be electrically connected into the circuit and system by any suitable means such as, for example, solder or screws. The embodiment of the time control circuit of the present invention which is best suited to solve the particular problem at hand is selected as the time control circuit 71.

A core comprising ferrite material assists in simplifying the iron core transformer 37 and in making its manufacture more economical. Various modifications of the various time control circuits of FIGS. 4, 5, 6 and 7 are, of course, possible. Thus, for example, for an engine 10 which operates at a great number of revolutions, the diode 101 of the embodiment of FIG. 5 may be utilized with the embodiments 4, 6, and 7, as well as with the embodiment of FIG. 5, to insure that the control voltage $U_s$ is decreased in magnitude to its initial magnitude when the next pulse 79 is fed to the monostable multivibrator. Furthermore, NPN type transistors may be utilized, instead of PNP type transistors, if suitable polarity changes are made in the circuit.

While the invention has been described by means of specific examples and in specific embodiments, I do not wish to be limited thereto, for obvious modifications will occur to those skilled in the art without departing from the spirit and scope of the invention.

What I claim is:

1. In a fuel injection system for an internal combustion engine having a suction duct, fuel feeding means for feeding fuel to said engine through said suction duct, fuel injection valve means in said fuel feeding means in said suction duct for controlling the quantity of fuel fed to said engine, said fuel injection valve means having electromagnetic control means for controlling the operation thereof, a crankshaft rotated at a determined number of revolutions per unit time and a pressure indicator in said suction duct for measuring the pressure in said suction duct, and a control circuit for controlling the quantity of fuel fed to said engine, said control circuit having an input mechanically coupled to the crankshaft of said engine, an output connected to the electromagnetic control means of said fuel injection valve means and including transformer means for controlling the time of operation of said control circuit in accordance with the number of revolutions of said engine thereby controlling the time of feeding and thus the quantity of fuel fed to said engine in accordance with the number of revolutions of said engine, said transformer means having a movably mounted core mechanically coupled to said pressure indicator and movable in accordance with variation of pressure in said suction duct to vary the inductance of said transformer means and a determined transformer characteristic curve of inductance versus displacement of said core, said control circuit having a control characteristic of displacement of said core versus time of feeding of fuel to said engine, a time control circuit connected in said control circuit for varying the control characteristic curve of said control circuit by varying the time of operation of said control circuit.

2. In a fuel injection system as claimed in claim 1, wherein said control circuit includes control voltage means for applying a control voltage to said control circuit to further control the time of operation of said control circuit, and wherein said time control circuit is connected to said control voltage means and varies said control voltage.

3. In a fuel injection system as claimed in claim 2, wherein said time control circuit comprises a capacitor connected to said control voltage means and charging and discharging circuit means connected to said capacitor.

4. In a fuel injection system as claimed in claim 3, wherein said charging and discharging circuit means of said time control circuit comprises resistor means and controllable switch means connected in series circuit arrangement with said resistor means and connected in said control circuit in a manner whereby said switch means is controlled in operation in accordance with the number of revolutions of said engine, and circuit means connecting said series circuit arrangement in parallel with said capacitor.

5. In a fuel injection system as claimed in claim 4, wherein the controllable switch means of the charging and discharging circuit means of said time control circuit comprises a transistor.

6. In a fuel injection system as claimed in claim 1, wherein said control circuit comprises multivibrator means having a stable state, an input, an output connected to the electromagnetic control means of said fuel injection valve means and a feedback path from said output to said input, said transformer means being connected in the feedback path of said multivibrator means, pulse producing means mechanically coupled to the crankshaft of said engine for producing an electrical pulse in accordance with the number of revolutions of said engine, said pulse producing means bieng connected to the input of said multivibrator means for controlling the state of stability of said multivibrator means in accordance with the number of revolutions of said engine, and control voltage means connected to the input of said multivibrator means for applying a control voltage to said control circuit to further control the time of operation of said control circuit, and wherein said time control circuit is connected between the multivibrator means and the control voltage means of said control circuit and varies the control voltage applied to said multivibrator means in conjunction with the pulse applied to said multivibrator means by said pulse producing means in accordance with the number of revolutions of said engine to control the operation of said multivibrator means thereby varying the duration time of said pulse and controlling the operation of said fuel injection valve means to control the time of feeding and thus the quantity of fuel fed to said engine.

7. In a fuel injection system as claimed in claim 6, wherein said transformer means comprises a primary winding and a secondary winding, said control voltage means comprises a source of electrical energy having a positive terminal and a negative terminal and potentiometer means connected across said source of electrical energy, and said multivibrator means comprises a first transistor having an input electrode, an output electrode, and a control electrode connected to the secondary winding of said transformer means, an input resistor connected at one end to the control electrode of said first transistor and connected at the other end to said potentiometer means, said input resistor being connected across the secondary winding of said transformer means and a second transistor having an input electrode, an output electrode, a control electrode, and an emitter-collector path connected to the primary winding of said transformer means, and wherein said time control circuit comprises a third transistor having a control electrode and an emitter-collector path, a first capacitor connecting the control electrode of said third transistor to the output electrode of said second transistor, a first resistor connecting the control electrode of said third transistor to the input electrode of said first transistor, a second resistor and a second capacitor connected in series circuit arrangement with said second resistor and the emitter-collector path of said third transistor.

8. In a fuel injection system as claimed in claim 6, wherein said transformer means comprises a primary winding and a secondary winding, said control voltage means comprises a source of electrical energy having a positive terminal and a negative terminal and potentiometer means connected across said source of electrical energy, and said multivibrator means comprises a first transistor having an input electrode, an output electrode and a control electrode connected to the secondary winding of said transformer means, an input resistor connected at one end to the control electrode of said first transistor and connected at the other end to said potentiometer means, said input resistor being connected across the secondary winding of said transformer means and a second transistor having an input electrode, an output electrode, a control electrode, and an emitter-collector path connected to the primary winding of said transformer means, and wherein said time control circuit comprises a charging capacitor having a plate connected to one end of said input resistor and a diode having an anode connected to the output of said first transistor and a cathode connected to said plate of said charging capacitor.

9. In a fuel injection system as claimed in claim 6, wherein said transformer means comprises a primary winding and a secondary winding, said control voltage means comprises a source of electrical energy having a positive terminal and a negative terminal and potentiometer means connected across said source of electrical energy, and said multivibrator means comprises a first transistor having an input electrode, an output electrode, and a control electrode connected to the secondary winding of said transformer means, an input resistor connected at one end to the control electrode of said first transistor and connected at the other end to said potentiometer means, said input resistor being connected across the secondary winding of said transformer means and a second transistor having an input electrode, an output electrode, a control electrode and an emitter-collector path connected to the primary winding of said transformer means, and wherein said time control circuit comprises a third transistor having an input electrode, an output electrode, a control electrode and an emitter-collector path, a first capacitor connecting the input electrode of said third transistor to the output electrode of said second transistor, a first resistor connected between the input electrode of said third transistor and one of the terminals of said source of electrical energy, a second resistor, a second capacitor connected in series circuit arrangement with said second resistor and the emitter-collector path of said third transistor and a third resistor connected between the output electrode of said third transistor and one of said terminals of said source of electrical energy.

10. In a fuel injection system as claimed in claim 6, wherein said transformer means comprises a primary winding and a secondary winding, said control voltage means comprises a source of electrical energy having a positive terminal and a negative terminal and potentiometer means connected across said source of electrical energy, and said multivibrator means comprises a first transistor having an input electrode, an output electrode and a control electrode connected to the secondary wording of said transformer means, an input resistor connected at one end to the control electrode of said first transistor and connected at the other end to said potentiometer means, said input resistor being connected across the secondary winding of said transformer means and a second transistor having an input electrode, an output electrode, a control electrode and an emitter-collector path connected to the primary winding of said transformer means, and wherein said time control circuit comprises a third transistor having an input electrode, an output electrode, a control electrode and an emitter-collector path, a resistance-capacitance time constant circuit connected to the output electrode of second transistor, phase reversing means connected between said resistance-capacitance time constant circuit and the input electrode of said third transistor, a first resistor, a first capacitor connected in series circuit arrangement with said first resistor and the emitter-collector path of said third transistor and a second resistor connected between the output electrode of said third transistor and one of the terminals of said source of electrical energy.

11. In a fuel injection system for an internal combustion engine; a monostable multivibrator circuit for generating pulses of electrical current, said multivibrator having an input circuit; means for timing the initiation of said pulses in synchronism with the rotation of the engine; means for timing the duration of said pulses including a variable inductive element in said input circuit said variable inductive element having a predetermined displacement versus inductance characteristics; means for continuously varying the inductance of said inductive element in accordance with a running function of the engine; means for producing a control voltage periodically varying in synchronism with the rotation of the engine; connecting means for applying said control voltage to said input circuit to further modify and control the duration of said pulses; and means actuated by said pulses for supplying fuel to the engine, whereby said control voltage establishes the duration of said pulses as a predetermined desired function of said displacement of said variable inductive element.

12. The fuel injection system for an internal combustion engine as defined in claim 11 wherein said variable inductive element is a variable displacement core transformer having primary and secondary windings inductively coupled through said core, said inductive coupling of said windings being a function of the displacement of said core.

13. The fuel injection system for an internal combustion engine as defined in claim 12 including coupling means for coupling said core to the intake manifold of said engine whereby said core is displaced as a function of the pressure prevailing within said intake manifold.

14. The fuel injection system for an internal combustion engine as defined in claim 11 wherein said means for producing a control voltage periodically varying in synchronism with the rotation of the engine comprises a transistor means having its base connected to the output of said monostable multivibrator circuit; resistor means connected in series with the collector-emitter path of said transistor means and forming a series circuit therewith; and capacitor means connected in parallel with said series circuit of said resistor means and said collector emitter path of said transistor means.

15. The fuel injection system for an internal combustion engine as defined in claim 11 wherein said means actuated by said pulses for supplying fuel to the engine comprises at least one electromagnetic valve transmitting fuel to said engine only in the interval of time determined by the duration of said pulses.

References Cited
UNITED STATES PATENTS 3,207,255  9/1965  Hahlganss _____ 123—102 X
3,272,187  9/1966  Westbrook _____ 123—139

RALPH D. BLAKESLEE, *Primary Examiner.*